United States Patent [19]

Frint et al.

[11] Patent Number: 5,262,134
[45] Date of Patent: Nov. 16, 1993

[54] PROCESS FOR PRODUCING SODIUM SALTS FROM BRINES OF SODIUM ORES

[75] Inventors: William R. Frint, Green River, Wyo.; William C. Copenhafer, Yardley, Pa.

[73] Assignee: FMC Corporation, Philadelphia, Pa.

[21] Appl. No.: 839,641

[22] Filed: Feb. 21, 1992

[51] Int. Cl.$^5$ ............................................. C01D 7/12
[52] U.S. Cl. ........................................ 423/184; 423/427; 423/206.2; 23/302 T
[58] Field of Search .............. 423/206 T, 184, 426, 423/427, 421, 189; 23/302 T; 299/5

[56] References Cited

U.S. PATENT DOCUMENTS

| | | | |
|---|---|---|---|
| 1,396,841 | 11/1921 | Hirschkind | 423/206 T |
| 1,911,794 | 5/1933 | Britton | 23/63 |
| 2,049,249 | 7/1936 | Cunningham | 23/63 |
| 2,193,817 | 3/1940 | Houghton | 23/38 |
| 2,388,009 | 10/1945 | Pike | 23/38 |
| 2,625,384 | 1/1953 | Pike et al. | 262/3 |
| 2,639,217 | 5/1953 | Pike | 403/206 T |
| 2,780,520 | 2/1957 | Pike | 423/206 T |
| 3,050,290 | 8/1962 | Caldwell et al. | 262/3 |
| 3,113,834 | 12/1963 | Beecher et al. | 23/63 |
| 3,119,655 | 1/1964 | Frint et al. | 23/63 |
| 3,184,287 | 5/1965 | Gancy | 23/63 |
| 3,455,647 | 7/1969 | Closter | 23/63 |
| 3,655,331 | 4/1972 | Seglin et al. | 423/206 T |
| 3,870,780 | 3/1975 | Guptill | 423/206 |
| 3,953,073 | 4/1976 | Kube | 299/5 |
| 3,991,160 | 11/1976 | Gancy et al. | 423/184 |
| 4,039,617 | 8/1977 | Kuo | 423/186 |
| 4,039,618 | 8/1977 | Gancy | 423/206 |
| 4,291,002 | 9/1981 | Arnold et al. | 423/189 |
| 4,344,650 | 8/1982 | Pinsky et al. | 299/4 |
| 4,401,635 | 8/1983 | Frint | 423/206 T |
| 4,584,077 | 4/1986 | Chlanda et al. | 423/206 T |
| 4,743,439 | 5/1988 | Ready | 423/421 |
| 4,869,882 | 9/1989 | Dome et al. | 423/206 |
| 5,043,149 | 8/1991 | Frint et al. | 423/206 T |

OTHER PUBLICATIONS

Chemical Engineering pp. 118-120 (May 1953) Trona→Soda Ash.

Primary Examiner—David Brunsman
Attorney, Agent, or Firm—Frank Ianno; Robert L. Andersen

[57] ABSTRACT

A process is described for producing sodium-based chemicals from a brine containing sodium carbonate and sodium bicarbonate by heating the brine to evaporate water and drive off carbon dioxide and obtain a solution that will crystallize sodium sesquicarbonate, cooling the solution, precipitating sodium sesquicarbonate crystals and separating a first mother liquor from the sesquicarbonate crystals. The first mother liquor is then cooled to a lower temperature to precipitate sodium carbonate decahydrate crystals, the decahydrate crystals are separated from a second mother liquor and the decahydrate crystals are recovered for use in the manufacture of sodium-containing chemicals, such as sodium carbonate monohydrate, anhydrous sodium carbonate or soda ash.

42 Claims, 4 Drawing Sheets

PROCESS FOR PRODUCING SODIUM SALTS FROM BRINES OF SODIUM ORES

This invention relates to an improved process for recovering sodium chemicals, including sodium carbonate and/or sodium bicarbonate values from underground ore formations, especially trona, useful in manufacturing soda ash, sodium bicarbonate, caustic soda, sodium sesquicarbonate and other sodium chemicals, and especially to the recovery of these sodium chemicals from aqueous brine solutions obtained by dissolving such underground ore formations.

In southwestern Wyoming, in the vicinity of Green River, a vast deposit of crude, mineral trona ($Na_2CO_3 \cdot NaHCO_3 \cdot 2H_2O$) which lies some 800 to 3000 feet beneath the surface of the earth has been discovered. Other such underground deposits of trona have also been discovered in Turkey and China. The main trona bed at Green River is present as a seam about 12 feet in thickness at approximately the 1500 foot level analyzing about 90% trona. The Green River trona beds cover 1000 square miles and consist of several different beds which generally overlap each other and are separated by layers of shale. In some areas, the trona beds occur over a 400 foot stratum with ten or more layers comprising 25% of the total stratum. The quality of the trona varies greatly, of course, depending on its location in the stratum.

A typical analysis of this crude trona being mined at Green River, Wyo., is as follows:

| Constituent | Percent |
| --- | --- |
| Sodium Sesquicarbonate | 90.00 |
| NaCl | 0.1 |
| $Na_2SO_4$ | 0.02 |
| Organic Matter | 0.3 |
| Insolubles | 9.58 |
| | 100.00 |

As seen in the above analysis, the main constituent of crude trona is sodium sesquicarbonate. The amount of impurities, primarily shale and other nonsoluble materials, is sufficiently large that this crude trona cannot be directly converted into products which can be utilized in many commercial processes. Therefore, the crude trona is normally purified to remove or reduce the impurities before its valuable sodium content can be sold commercially as: soda ash ($Na_2CO_3$), sodium bicarbonate ($NaHCO_3$), caustic soda (NaOH), sodium sesquicarbonate ($Na_2CO_3 \cdot NaHCO_3 \cdot 2H_2O$), a sodium phosphate ($Na_5P_3O_{10}$) or other sodium-containing chemicals.

One major use for the crude trona is to convert and refine it into soda ash. In order to convert the sodium sesquicarbonate content of the trona to soda ash in commercially feasible operations, two distinct types of processes are employed. These are the "Sesquicarbonate Process" and the "Monohydrate Process".

The "Sesquicarbonate Process" for purifying crude trona and producing a purified soda ash is by a series of steps involving: dissolving the crude mined trona in a cycling, hot mother liquor containing excess normal carbonate over bicarbonate in order to dissolve the trona congruently, clarifying the insoluble muds from the solution, filtering the solution, passing the filtrate to a series of vacuum crystallizers where water is evaporated and the solution is cooled causing sodium sesquicarbonate to crystallize out as the stable crystal phase, recycling the mother liquor to dissolve more crude trona and calcining the sesquicarbonate crystals at a temperature sufficient to convert same to soda ash.

A more direct and simplified method which was subsequently developed is the "Monohydrate Process" which yields a dense, organic-free soda ash by a series of steps involving: calcining the crude trona at a temperature of 400° C. to 800° C. to convert it to crude sodium carbonate and removing the organics by oxidation and distillation, dissolving the crude sodium carbonate in water, clarifying the resulting sodium carbonate solution to remove insolubles as muds therefrom, filtering the solution, evaporating water from the clarified and filtered sodium carbonate solution in an evaporator circuit, crystallizing from the pregnant mother liquor sodium carbonate monohydrate, calcining the monohydrate crystals to produce dense, organic-free soda ash and recycling the mother liquor from the crystals to the evaporating step.

The calcination of the crude trona in the above process has a threefold effect. First, by calcining between a temperature of about 400° C. to 800° C., the organic matter present in the crude trona is removed. Secondly, the calcination effects a conversion of the bicarbonate present in the crude trona to sodium carbonate. Lastly, the crude sodium carbonate resulting from the decarbonation has a greater rate of solubility than the crude trona. A comparison of the solubility rates is set forth in Table I.

TABLE I

| | Percent $Na_2CO_3$ in Solution | |
| --- | --- | --- |
| Time, Minutes | Crude Trona | Crude Sodium Carbonate |
| 1 | 13 | 31.5 |
| 2 | 17 | 32.5 |
| 3 | 18.5 | 32.5 |
| 5 | 19 | 32.0 |

The ore used in the "Sesquicarbonate Process" and "Monohydrate Process" is conventionally dry mined trona obtained by sinking shafts of 1500 feet or so and utilizing miners and machinery to dig out the ore. The underground mining techniques vary, including room and pillar mining, continuous mining, long wall mining, etc., and all have been employed to improve mining efficiency depending on the mine depth and ore variations. However, because of the depth of the mine and the need to have miners and machinery operating underground to dig and convey the ore to the surface, the cost of mining the ore is a significant part of the cost of producing the final product.

One mining technique which has been tested and developed to avoid the high cost of having miners and machinery underground is solution mining. In its simplest form, solution mining is carried out by contacting a sodium-containing ore such as trona with a solvent such as water to dissolve the ore and form a brine containing dissolved sodium values. The brine is then recovered and used as feed material to process it into one or more sodium salts. The difficulty with solution mining an ore such as trona is that it is an incongruently dissolving double salt that has a relatively slow dissolving rate and requires high temperatures to achieve maximum solubility and to yield highly concentrated solutions which are required for high efficiency in present processing plants. Further, solution mining may also yield over time brine solutions of varying strength, which must be accommodated by the processing plant. Also, the brine may be contaminated with chlorides, sulfates and the like, which are difficult to remove when processing the brines into sodium-containing chemicals.

In an effort to improve solution mining processes, it was first proposed in U.S. Pat. No. 2,388,009 issued to R. D. Pike on Oct. 30, 1945 that a hot mother liquor containing excess sodium carbonate be circulated underground to achieve a brine saturation at temperatures above 85° C. for use in sodium sesquicarbonate production. When tested, this system did not yield the saturated exit brine desired for commercial application despite inordinately high inlet temperatures and excessive heat losses.

Another proposal in U.S. Pat. No. 2,625,384 issued to R. D. Pike et al on Jan. 13, 1953 used water as a solvent under essentially ambient temperatures to extract trona underground in mined areas, but the dilute solution had to be enriched by heating and dissolving additional mechanically mined trona in it before being processed into soda ash. The process has never been found workable. Entering such mined areas which may no longer have roof bolts and in which subsidence of the area has commenced is too hazardous for normal practice.

Other patents involved in solution mining such as U.S. Pat. No. 3,119,655 issued to W. R. Frint et al on Jan. 28, 1964 and U.S. Pat. No. 3,050,290 issued to N. A. Caldwell et al continued to advocate use of high solvent temperatures to increase trona dissolution, with the '655 patent also teaching fortifying the recovered hot brine with a mother liquor containing sufficient sodium carbonate values to yield a solution from which sodium sesquicarbonate will precipitate.

In all of these prior art solution mining processes, the intent was to use either a heated aqueous solvent or to fortify the recovered brine with added alkali values, to produce a highly concentrated solution which could be economically processed in the conventional Monohydrate Process or Sesquicarbonate Process, described above.

Another approach, not involving a heated aqueous solution as the solvent, was revealed in U.S. Pat. No. 3,184,287 issued to A. B. Gancy on May 18, 1965. This involved using sodium hydroxide (caustic soda) in the aqueous solvent to increase the dissolving rate and to reach a high solubility of trona values at low temperatures and to achieve congruent dissolving. This process uses a caustic soda solution in excess of 3% NaOH by weight to achieve brine solutions containing in excess of 19% sodium carbonate which can be processed into soda ash via the monohydrate process, i.e., evaporation to yield sodium carbonate monohydrate crystals. This process was placed into practice in 1984 and has resulted in exit well brine solutions containing up to 28% sodium carbonate, which can be readily processed economically into soda ash. However, this level of sodium carbonate concentration requires an inlet solvent containing about 8% caustic soda. This caustic soda solvent is expensive to manufacture, even when the lime-causticization process is used and the soda value is supplied via the solution mined brine. Also, caustic soda is currently in short supply and the selling price has increased to the point where it is more profitable to sell the caustic soda rather than use it to lower trona mining costs.

U.S. Pat. No. 3,953,073 issued to W. H. Kube on Apr. 27, 1976 pointed out that using less caustic in the solvent (1%-3%) resulted in more soda ash values in the outlet brine per ton of caustic soda required, if the brine were heated and saturated at elevated temperatures. However, the resulting brine contains a more dilute soda ash content than when using higher caustic soda concentrations, and much of the soda ash value (total alkali) in the solution is present as sodium bicarbonate which complicates the processing into soda ash. No attempt was made to explain how this semi-dilute sodium bicarbonate/carbonate mixture could be economically converted into soda ash.

In terms of obtaining maximum dissolution of alkali values per change in degree centigrade of the aqueous solvent it is found that maximum increases in percent dissolution per degree takes place when the temperature increases from 0° C. to 30° C. That is, in terms of obtaining maximum increases in alkali value dissolution per degree (centigrade) of heat energy employed in the solvent, one obtains the largest increases in the range of 0° C. to about 30° C. Within this range, heat efficiency as a means of increasing dissolution is greatest. Beyond 30° C., the total amount of alkali values dissolved does increase with temperature, but the percent of increased dissolution obtained per degree of heat added decreases substantially. This means that heating the solvent beyond 30° C. is not an efficient way of using heat energy to increase dissolution of alkali values. This is visually apparent from FIG. 2 which is a graph of the percent change in dissolution of alkali values per degree (centigrade) plotted against temperature.

Unfortunately, the temperature range in which heat energy is most efficient in dissolving equivalent alkali values, say 0° C. to 30° C., yields saturated solutions are still relatively dilute. For example, at 20° C., an aqueous solution in equilibrium with solid trona contains dissolved therein about 17% $Na_2CO_3$ and 4% $NaHCO_3$. At 30° C., the solution contains about 17.3% $Na_2CO_3$ and about 4.7% $NaHCO_3$. This shows that small differences in solvent temperatures will not significantly change the equilibrium composition and that the final composition is substantially more dilute than that obtained by using costly sodium hydroxide in the solvent, or by heating the solvent to high temperatures which is not in the interest of energy economy.

None of the previous patents or literature has revealed a process where the problem of dealing with incongruent dissolution, low dissolving rates, dilute brines and varying brine concentration can be overcome without economic disadvantages of high temperatures and/or costly additives to the solvent.

It has now been found that these problems can be overcome by a process for producing valuable sodium-based chemicals from a brine containing sodium carbonate and sodium bicarbonate, and preferably having a total alkali value of at least about 8%, which comprises heating the brine to evaporate water and to drive off carbon dioxide therefrom until the concentration of sodium carbonate and sodium bicarbonate in the brine form a solution that will crystallize sodium sesquicarbonate, cooling the evaporated brine, preferably to a temperature of about 25° C. to about 45° C., precipitating sodium sesquicarbonate crystals, separating the sodium sesquicarbonate crystals from a first mother liquor, cooling the first mother liquor to a lower temperature, preferably to a temperature of about 0° C. to about 20° C., precipitating sodium carbonate decahydrate crystals, separating sodium carbonate decahydrate crystals from a second mother liquor, and recovering the sodium carbonate decahydrate crystals for use in the manufacture of sodium-containing chemicals.

The term "TA" or "total alkali" as used herein refers to the weight percent in solution of sodium carbonate and/or sodium bicarbonate (which latter is conventionally expressed in terms of its equivalent sodium carbonate content). For example, a solution containing 17 weight percent $Na_2CO_3$ and 4 weight percent $NaHCO_3$ would have a TA of 19.5%.

The term "sodium bicarbonate TA divided by the solution TA" as used herein refers to the sodium bicarbonate TA, expressed in terms of its equivalent sodium carbonate content, divided by the total solution TA. For example, at 17 weight percent sodium carbonate and 4 weight percent sodium bicarbonate the ratio would be 0.129.

The present process is most advantageous in being able to utilize dilute brines obtained by using low temperature water as the solvent for solution mining because these dilute brines can be readily handled by the instant process. In addition, the process lends itself to handling brines which are nonuniform, such as those that vary in their sodium bicarbonate to sodium carbonate ratios that would be obtained when using low temperature water to solution mine trona because of its incongruent dissolution phenomena, as explained below. Further, the process enables one to utilize solution mined trona which has relatively large amounts of soluble impurities such as chlorides, sulfates, organics and silicates which can occur from in situ dissolving of certain ore deposits or from using as aqueous solvents, solutions which have been considered as waste streams because of the contaminants contained therein. The products obtained from the process include different sodium-containing salts and they are obtained in a relatively pure state with the bulk of the impurities remaining in waste streams of the process. This is in contrast to the prior art processes heretofore known which employed saturated solutions of sodium carbonate containing salts, or at least highly concentrated solutions of said salts, as feeds to the prior art processes in order to make these processes economically viable.

When trona ore is solution mined with water, the trona is incongruently dissolved. Therefore, when crude trona is dissolved in water, sodium sesquicarbonate (which constitutes 90% of the trona ore) cannot be crystallized from the solution by cooling. This is readily seen by inspecting the line YZ in FIG. 1, the so-called trona/water line which defines the concentrations of sodium bicarbonate and sodium carbonate in solution obtained when dissolving trona (sodium sesquicarbonate) in water, the actual composition of which is dependent on temperature. The graph shows three solubility isotherms one at 100° C., one at 30° C. and one at 20° C.

Figure 1:
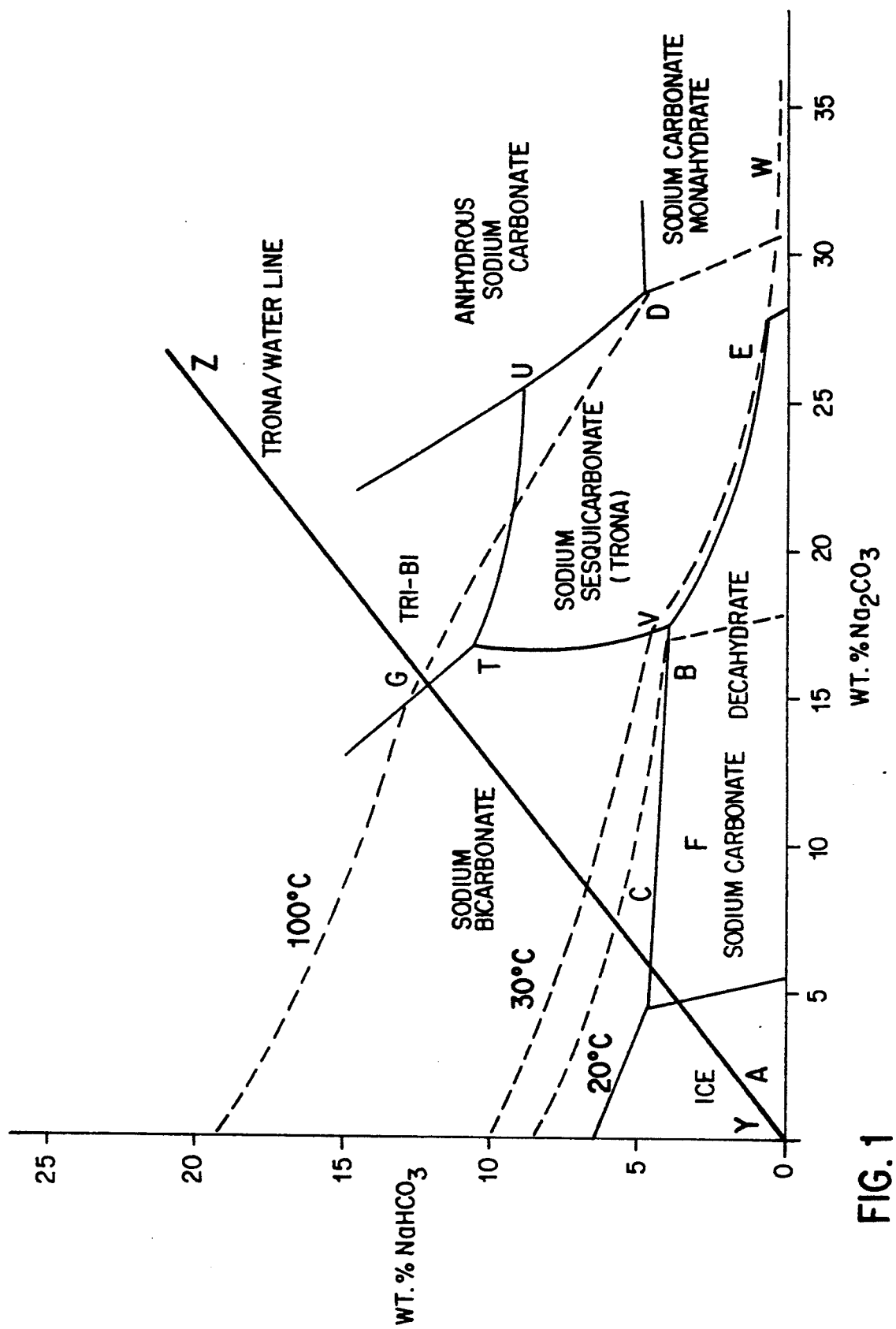
FIG. 1 is a graph of the phase relationship between water, sodium bicarbonate, and sodium carbonate, including some solubility isotherms, which define the solid salts obtained by crystallizing solutions of varying concentrations of sodium carbonate and sodium bicarbonate.

FIG. 1 is an overall graph of the phase relationship between water, sodium bicarbonate and sodium carbonate, including the three isotherms reviewed above, which define the solid salts obtained by crystallizing solutions of varying concentrations of sodium carbonate and sodium bicarbonate. As will be seen by observing line YZ, it never intersects the sodium sesquicarbonate boundaries defined by point T-U-V and W which is the area where sodium sesquicarbonate crystals are in equilibrium with such solutions. It is only within this area that sodium sesquicarbonate can be crystallized from solutions containing the concentrations of sodium carbonate and sodium bicarbonate illustrated. Accordingly, since no point on the line defining the trona in water solution falls within the sodium sesquicarbonate region, it is apparent that sodium sesquicarbonate cannot be dissolved in water and crystallized back out when the solution is cooled.

Solution mining of trona at 20° C. with a water solvent results in dissolving the trona along the YZ line set forth in FIG. 1 until the solution reaches saturation with respect to the bicarbonate at the 20° C. solubility isotherm. At that point, continued contact of the solvent with more trona results in the solution moving to the right along the solubility isotherm resulting in sodium bicarbonate precipitating out and additional sodium carbonate dissolving until an equilibrium is reached with the trona at about 17% sodium carbonate and about 4% sodium bicarbonate. If the water solvent is about 30° C., the process is the same except for using the 30° C. solubility isotherm and the final composition is very similar, at about 17.3% sodium carbonate and about 4.7% sodium bicarbonate. From this it will be seen that small increases in solvent temperature, at these temperature ranges, will not significantly change the equilibrium composition and therefore raising the temperature of the water solvent above the normal temperature of the trona formation which is normally about 20° C. to 22° C. (at about 1500 feet below the surface) is not in the interest of heat economy.

As the trona is incongruently dissolved in the water solvent and reaches equilibrium a layer of sodium bicarbonate will be formed on the surface of the trona face being dissolved. The sodium bicarbonate layer impedes the dissolution of the trona, but does not stop it, since sodium bicarbonate is also soluble in water. What complicates the solution mining process when using ground temperature water as the solvent is that the resulting exit brine changes in composition with time because more bicarbonate dissolving occurs and less trona goes into solution as time progresses. Ultimately, the brine will become gradually reduced in strength but the degree of this depends on the relative amounts of trona and Water used. When large amounts of trona are present and the amount of water solvent is limited, so that the trona-water combination approaches equilibrium values, the resulting brine ar equilibrium will continue to contain about 17% sodium carbonate and about 4% sodium bicarbonate. This occurs when the area being solution mined by the water solvent contains millions of tons of trona with lots of exposed surface area. In time, it would be expected that the exit brine would have difficulty in reaching an equilibrium with the trona. Then the exit brine composition will move to the left with the bicarbonate concentration increasing and the carbonate concentration decreasing. Although this may not occur for many years, any process which uses the brine as a feed stock should be able to handle this change in feed liquor composition without major process or equipment changes. This is in fact what the present process does. The above concentrations of sodium carbonate and sodium bicarbonate at equilibrium are based upon pure solutions. If substantial amounts (over 1%) of sodium chloride and/or sodium sulfate or other salts are also present, this will reduce the amount of carbonates in solution at equilibrium.

In order to obtain brine for use as the feed solution in the present process, water or water solution containing small amounts of sodium carbonate and/or sodium bicarbonate are employed as the solvent for solution mining of the trona ore. For maximum solution mining of trona an ideal solvent is a water solution containing less than about 3% sodium carbonate and/or less than 3% sodium bicarbonate such as represented by the region designated A on the phase diagram of FIG. 1. The temperature of the solvent is preferably maintained at the temperature of the trona formation being solution mined which is at about 20° C. to 22° C. (at a depth of about 1500 feet below the surface), and which may vary a few degrees above or below this point. Actual al experience has shown that solution mining at ground temperature using water or a dilute water solution will result in a brine with a composition in the vicinity of region B shown in FIG. 1. This brine normally is about 4% by weight sodium bicarbonate and about 13% to about 16% by weight sodium carbonate, the exact amounts varying and depending on other salts and impurities that may be dissolved in the solvent. A brine having this concentration range of sodium carbonate and sodium bicarbonate will occur when there is ample trona to dissolve and the solvent contacts the trona even though part or perhaps all of the trona has a layer of sodium bicarbonate formed on its surface. One of the easiest methods to assure that there is ample trona surface available for solution mining is to mechanically mine the trona and then contact the remaining trona with solvent to solution mine the remaining trona until it is covered with a layer of bicarbonate, at which point the solution composition will begin to change. An ideal brine useful in the present process is that obtained from the process described in U.S. Pat. No. 5,043,149 issued to W. R. Frint et al on Aug. 27, 1991. In this patented process, insoluble tailings from a soda ash plant are slurried with an aqueous medium and pumped down a well to an underground mined out cavity where the tailings are disposed of and the slurrying liquor used to dissolve remaining trona in the mined out area before the brine is pumped to the surface enriched in both sodium carbonate and sodium bicarbonate values. Most desirably, the brine is removed at the ground temperature of the trona bed at or near saturation with dissolved trona.

While the above represents the ideal brines useful in the present process, it should be understood that the brine feed to the present process may for example contain less sodium carbonate and more sodium bicarbonate such as the region designated as C in FIG. 1. This contains about 9% by weight sodium carbonate and about 5% by weight sodium bicarbonate. In fact, the process is suitable for starting with any bicarbonate/carbonate brine, and preferably when the recovered brine solution has a total alkali value of at least about 8% since handling brines which are more dilute than this become economically unattractive. For example, mine water which is water that has been in contact with trona formations and has dissolved trona, recovered from underground operations, can be employed as a brine feed, preferably when it contains at least 8% TA. As will be explained subsequently, the concentration of sodium carbonate and sodium bicarbonate in the brine and the ratio of the bicarbonate to carbonate salt is not critical since the present process is capable of handling such varied brines without any material changes in the processing steps or processing conditions.

In the first processing step, the feed brine is heated and evaporated at temperatures of about 90° C. to about 115° C. and preferably to about 100° C. to about 110° C., to remove water and concentrate the sodium content of the brine. While this evaporation step can be accomplished in many different types of equipment, the most preferred are multiple-effect evaporators or mechanical vapor recompression units (MVR). Because of their high efficiencies MVR's are especially desired. They operate by compressing the overhead vapors of the evaporator by means of motor driven compressors and passing the compressed vapors through a heat exchanger where the heat is given up to the boiling brine solution passing through or over the heat exchanger. As water is removed, carbon dioxide is evolved and the solution composition moves towards the region indicated by D in FIG. 1 which represents one composition saturated with the illustrated amounts of sodium bicarbonate/sodium carbonate in solution at 100° C. While it is possible to obtain a brine composition anywhere along the 100° C. solubility isotherm within the sodium sesquicarbonate area, depending on the concentration of the brine feed, it has been found that the region indicated by D in FIG. 1, with some deviation, is the normal end point composition of the brine solution even if the brine starting composition has much different ratios of sodium bicarbonate to sodium carbonate. The region around D is the preferred composition for the evaporated brine since it concentrates the sodium carbonate content of the brine and diminishes the sodium bicarbonate content of the brine which facilitates subsequent crystallization steps and maximizes recovery of sodium carbonate values from the brine.

When the brine solution is concentrated by evaporation and the bicarbonate concentration is increased, the vapor pressure of carbon dioxide above the solution increases and as water vapor is removed carbon dioxide is also carried away. Loss of carbon dioxide from the solution results from decomposing the sodium bicarbonate to sodium carbonate according to the following chemical reaction:

$$2NaHCO_3 \rightarrow Na_2CO_3 + H_2O + CO_2 \uparrow$$

The solution of concentrated brine in the vicinity of region D in FIG. 1 has a sodium bicarbonate TA (expressed as equivalent sodium carbonate) divided by total solution TA of 0.09 to 0.11. If ideally the brine prior to evaporation is in the region represented by B in FIG. 1, where the above ratio is 0.10 to 0.15, there is only a slight decrease in the above ratio after the evaporation step has been completed. However, if the initial feed brine contains a higher sodium bicarbonate TA to solution TA ratio such as represented by region C where the above ratio is about 0.23, or even up to a weight ratio of 0.33 (the value of trona) the increased sodium bicarbonate content rapidly increases the carbon dioxide vapor pressure above the heated solution and more carbon dioxide is removed. This means that in such brine solutions, regardless of the sodium bicarbonate TA to solution TA ratio in the feed brine, the evaporation step results in a composition having substantially the same ratio as the final product of the evaporation step expressed as region D in FIG. 1. The reason the ratio of sodium bicarbonate TA divided by total solution TA decreases very slightly when the feed brine goes from region B to region D in FIG. 1 is because the feed brine has a small vapor pressure of carbon dioxide. The vapor pressure of carbon dioxide above the cool feed brine at region B is less than 1/20 of the hot saturated brine at region D. During the evaporation stage, the large amount of water removed during the step appears to facilitate removal of carbon dioxide from the solution in arriving at region D in FIG. 1. By contrast, hot saturated solutions of trona which fall in region G in FIG. 1 on the 100° C. solubility isotherm have carbon dioxide vapor pressures over 300 times greater than the carbon dioxide vapor pressure above the cool solutions at region C and 30 times greater than the hot solutions at region D of FIG. 1. This wide range of carbon dioxide vapor pressures in the varying solutions at different temperatures is helpful in understanding why the evaporation step yields a sodium bicarbonate TA to solution TA ratio in the final product which is essentially in the same region of the phase diagram regardless of the brine feed starting ratio. If this ratio above is higher, the starting brine at the same temperature will also be more dilute, thus requiring more evaporation at higher carbon dioxide vapor pressures which removes more carbon dioxide and thus lowers the sodium bicarbonate TA to solution TA ratio to the area identified as region D in FIG. 1.

This initial evaporation step of the present process removes the major disadvantages of using cool water as a trona solution mining solvent because the evaporation, when done at elevated temperatures, not only concentrates the solution-mined brine to where product crystals can be recovered, but the evaporation step also yields a sodium bicarbonate TA to solution TA ratio so that a liquid with a reasonably constant chemical composition occurs that can be further processed with consistent results. This thereby overcomes two of the major objections to using ambient water as an in situ solvent for dissolved trona.

The region identified as D on the phase diagram of FIG. 1 is in an area where three solid components could possibly be crystallized. These are anhydrous sodium carbonate crystals, sodium carbonate monohydrate crystals and sodium sesquicarbonate crystals. Also, if sufficient sodium chloride and sodium sulfate are in solution, the possibility of burkeite crystals ($2Na_2SO_4 \cdot Na_2CO_3$) exists. To avoid producing a mixture of crystals of the above three species, the evaporation step should be terminated just before the solution composition arrives at the phase point of the three crystals, assuring that only sodium sesquicarbonate crystals will be obtained during the subsequent crystallization stage. Burkeite crystals are avoided by limiting the sulfate content of the water solvent when waste streams are used as part of the solvent used in the solution mining operation.

The feed brine may be filtered to remove any insoluble material present from the solution mining step before it is introduced into the evaporating process described above. However, we prefer to carry out a filtration step on the evaporated solution obtained after the evaporation step has been completed. The reason is that some important impurities associated with trona are organic materials such as mono- and dicarboxylic acids which are soluble in these alkaline solutions. If these organic constituents exceed a certain level in the feed solution, which has been found to be the case, then evaporation and concentration of the solution results in the organics exceeding their solubility limit and some are precipitated. By filtering the concentrated solution after evaporation, rather than the feed brine, the filtration then removes the precipitated organic impurities in the solution as well as any insolubles present in the feed brine in one filtration operation. This is especially true when the starting brine has less than 0.05 weight percent insolubles present since these small amounts of insolubles can be handled readily in small filtration units. Larger amounts of insolubles might require an initial brine feed filtering to remove such quantities of insolubles.

The evaporated brine may require treatment to remove organic impurities, depending on the type and amount of such organic compounds. Where required, it is most conveniently carried out by passing the brine through a bed of adsorbent material such as activated carbon, charcoal, or equivalent adsorbents, and selectively adsorbing the organics while permitting the brine passing through the bed to be recovered with a reduced organics level.

The next processing step after filtration of the evaporated solution is to cool the solution to precipitate sodium sesquicarbonate crystals. The solution should be cooled to from about 25° C. to about 45° C., preferably about 30° C. to about 40° C., to produce a slurry of sodium sesquicarbonate crystals and to move the liquor composition from region D in FIG. 1, obtained after the evaporation stage, to region E in FIG. 1 where the sodium sesquicarbonate crystals are in equilibrium with their mother liquor. If the cooling is achieved by reducing the pressure and evaporating additional water, as is the case when evaporative cooling is carried out, the liquor composition will move even further to the right of region E. If the solution contains large amounts of sodium chloride, the liquor composition will be to the left of region E. While cooling to about 25° C. to about 45° C. will yield the crystal slurry desired, the preferred cooling temperature is about 30° C. to about 40° C. to maximize the amount of crystal slurry while a temperature of about 35° C. to about 40° C. approaches the optimum in crystal slurry yield balanced against the cost of cooling requirements. If required, the use of crystal growth promoters such as advocated in U.S. Pat. Nos. 2,954,282 and 3,037,849, may be desirable. Since the mother liquor will contain the soluble impurities present in the evaporated brine, a higher purity product will result by washing the sodium sesquicarbonate crystals after separating them from the mother liquor. The resulting sodium sesquicarbonate crystals may be recovered after crystallization and washing as a product per se which is useful in detergent applications or animal feed supplements. Alternately, the sodium sesquicarbonate crystals can be heated to convert them into a medium density soda ash well accepted in the industry, or the crystals can be used as a feed material for making other sodium-containing chemicals such as sodium phosphate or sodium bicarbonate.

If all or a portion of the recovered sodium sesquicarbonate crystals are not desired as product, an optional method for converting these crystals into sodium carbonate and recovering them as sodium carbonate values is to recycle the crystals into the initial evaporation stage with the brine feed solution which has the effect of converting the bicarbonate values of the sodium sesquicarbonate to carbonate and allowing this sodium carbonate to be recovered in subsequent stages of the process. This can readily be done by dissolving or slurrying up the sodium sesquicarbonate crystals which have been separated from their mother liquor with a portion of the feed brine stream and introducing the mixture into the initial evaporating stage.

In the initial cooling step to about 30° C. to about 40° C. the mother liquor recovered after separation of the sodium sesquicarbonate crystals has a composition represented by region E in FIG. 1 and has a very low ratio of sodium bicarbonate TA to solution TA, this ratio being no higher than about 0.04 and usually less. Almost all of the bicarbonate has been removed and recovered in the sodium sesquicarbonate crystals, leaving a mother liquor having very low amounts of sodium bicarbonate.

The next step in the instant process is to further cool this liquor down to from about 0° C. to about 20° C., and preferably about 5° C. to about 15° C., to crystallize sodium carbonate decahydrate ($Na_2CO_3 \cdot 10H_2O$). These crystals grow to large size and contain over 63% water, which greatly reduces the amount of water present in the mother liquor. When cooling to 12° C. about 54% of the water in the feed to this step will be in the crystals and at 5° C. it will up to 60%. If the cooling is achieved by evaporation of water then even more water in the mother liquor is recovered in the crystals. The temperature at which cooling is carried out to precipitate the sodium carbonate decahydrate crystals is influenced by the impurities level and the amount of sodium bicarbonate remaining in the liquor being cooled. Since the impurity levels in the starting brine have now been increased about fivefold in the mother liquor associated with the decahydrate crystals, the temperature selected must precipitate the decahydrate crystals but avoid cooling to temperatures low enough to co-crystallize any other salt impurities because of the high concentration of these impurities in the liquor. Further, if the liquor fed to the decahydrate cooling unit is not sufficiently low in sodium bicarbonate values and does not contain a substantial amount of impurities such as sodium chloride and sodium sulfate, the bicarbonate level in the decahydrate mother liquor can build up to 4% by weight without difficulties. Thereafter, sodium bicarbonate will commence to crystallize especially if the cooling is carried out at temperatures below 5° C.

In general, use of cooling temperatures of from about 5° C. to about 15° C. have been found workable and without difficulty, especially where the sodium sesquicarbonate mother liquor has been cooled sufficiently to remove the bicarbonate values as sodium sesquicarbonate crystals and to remain with only about 1% by weight of sodium bicarbonate. This is essentially the result obtained in region E of FIG. 1 after crystallizing and separating sodium sesquicarbonate from the evaporated brine feed.

As with the previous crystal washing step described above, good separation by washing the sodium carbonate decahydrate crystals to remove the impurities contained in the residual mother liquor on the crystals will improve the final product purity. Typically, the final mother liquor composition will be in the vicinity of region F in FIG. 1, although this will vary depending on impurity levels and bicarbonate levels in the remaining solution. If the desired recovery of alkali values has been achieved because the concentration of impurities to alkali values in the mother liquor is high, the mother liquor can be discarded from the system as waste. However, the composition of the mother liquor as far as the ratio of sodium bicarbonate to sodium carbonate is concerned, will be similar to the feed brine as shown by comparison of regions B and C in FIG. 1 which represent the feed brines and region F which typically represents the composition of the mother liquor recovered from the decahydrate crystallizing unit. This means that the mother liquor can be processed again to recover more sodium carbonate/sodium bicarbonate values and further increase the concentration of impurities and diminish the volume of waste product. In a continuous process, where further processing of decahydrate mother liquor is desired, a portion of the liquor would be discarded as purge to control impurity levels while the remainder would be recycled, for example, to the initial feed brine. Alternately, if the total alkali values are too low the remaining portion of the mother liquor may be recycled as solution mining inlet solvent to increase its TA value before being used as feed brine to the initial evaporating step. Another approach is to carbonate the decahydrate mother liquor and, on cooling, recover sodium bicarbonate crystals and discard the mother liquor.

The sodium carbonate decahydrate crystals so recovered can be melted by adding a small amount of water and heating above 30° C. to yield a pure solution of about 30% by weight sodium carbonate. The crystals or solution in turn can be used as a raw material for producing sodium-containing chemicals such as sodium phosphates or most notably for the making of caustic soda by a chemical reaction with lime. If solid soda ash is the desired product, the 30% sodium carbonate solution is further evaporated at temperatures above about 60° C. but below about 110° C. to form sodium carbonate monohydrate crystals or at temperatures above 110° C. to form anhydrous sodium carbonate crystals. If any objectional amounts of sodium bicarbonate values remain in the sodium carbonate evaporator feed, they can easily be converted to sodium carbonate with small amounts of dilute caustic soda. The monohydrate crystals are normally dried to form a dense soda ash. Sodium carbonate decahydrate crystals can also be used to produce a special grade of low density soda ash by gently drying the crystals, without melting, at low temperature but it is more difficult than the monohydrate route which is more popular in industrial practice.

Typically, the 30% sodium carbonate solution obtained by melting the sodium decahydrate crystals is sent to a monohydrate evaporator/crystallizer where the solution is heated to a temperature of about 100° C. by suitable multiple-effect evaporators or more preferably by a vapor recompression evaporator which allows evaporation of the solution and crystallization of the sodium carbonate monohydrate. The monohydrate crystal slurry is removed from the monohydrate evaporator crystallizer and sent to a centrifuge where the crystals are separated from their mother liquor. The mother liquor is returned to the monohydrate evaporator crystallizer while the crystals are sent to a dryer and heated until converted into soda ash. Some of the mother liquor being returned from the centrifuge to the monohydrate evaporator crystallizer may be subject to purge to control impurity levels, or preferably this monohydrate mother liquor purge is recycled to the sodium decahydrate crystallizer by mixing it with mother liquor from the sodium sesquicarbonate crystallization step and feeding the mixture to the sodium decahydrate crystallizer. This permits recovery of the sodium carbonate values in the monohydrate mother liquor purge stream as decahydrate crystals and since the purge stream of mother liquor from the sodium decahydrate crystallizer is more concentrated in impurities less sodium carbonate values are purged.

The 30% sodium carbonate solution produced by melting the decahydrate crystals is relatively pure and free of impurities and when used to produce soda ash via the sodium carbonate monohydrate route will yield a final soda quality which is at least as good as, and probably better than existing soda ash produced via the conventional monohydrate process. However, if an exceedingly high purity soda ash is desired, the monohydrate crystallizer mother liquor can be purged at a high rate from the stream returning mother liquor from the centrifuge to the evaporator. This keeps impurities in the mother liquor very low and this purge can be sent to the decahydrate crystallization step so that no additional alkali is lost from the system.

Referring now to the drawings, FIG. 1 is a graph of the phase relationship of aqueous solutions containing various amounts of sodium carbonate and sodium bicarbonate, and the salts that are obtained from the solutions by cooling and crystallizing the solutions. Thus, the salts defined in FIG. 1 are in equilibrium with solutions of sodium carbonate and sodium bicarbonate contained within the defined borders identifying that salt. FIG. 1 also has three solubility isotherms at 100° C., 30° C. and 20° C. which define the maximum concentration of sodium carbonate and/or sodium bicarbonate at these temperatures. Additionally, a line YZ is illustrated which defines the concentrations of sodium carbonate and sodium bicarbonate in a solution in which trona is dissolved, at varying temperatures, and in which the trona solution is saturated without any crystallization of dissolved salts. It will be observed that line YZ never intersects the area defined by the area designated as sodium sesquicarbonate in FIG. 1. This indicates that regardless of what temperature trona is dissolved in water, on cooling the saturated solution one never obtains sodium sesquicarbonate crystals from such a solution. More precisely, if trona were dissolved in water having a temperature of about 30° C., the concentration of trona which can be dissolved in this water would continue up the YZ line until it intersects the 30° C. isotherm. At this point, the solution is saturated with sodium bicarbonate and is not in equilibrium with trona in that no salts precipitate from the solution. If the solution is then cooled, the crystal salt that will be precipitated from that solution will be sodium bicarbonate. It is this property that is responsible for the incongruent dissolution of trona in a water solvent.

Figure 2:
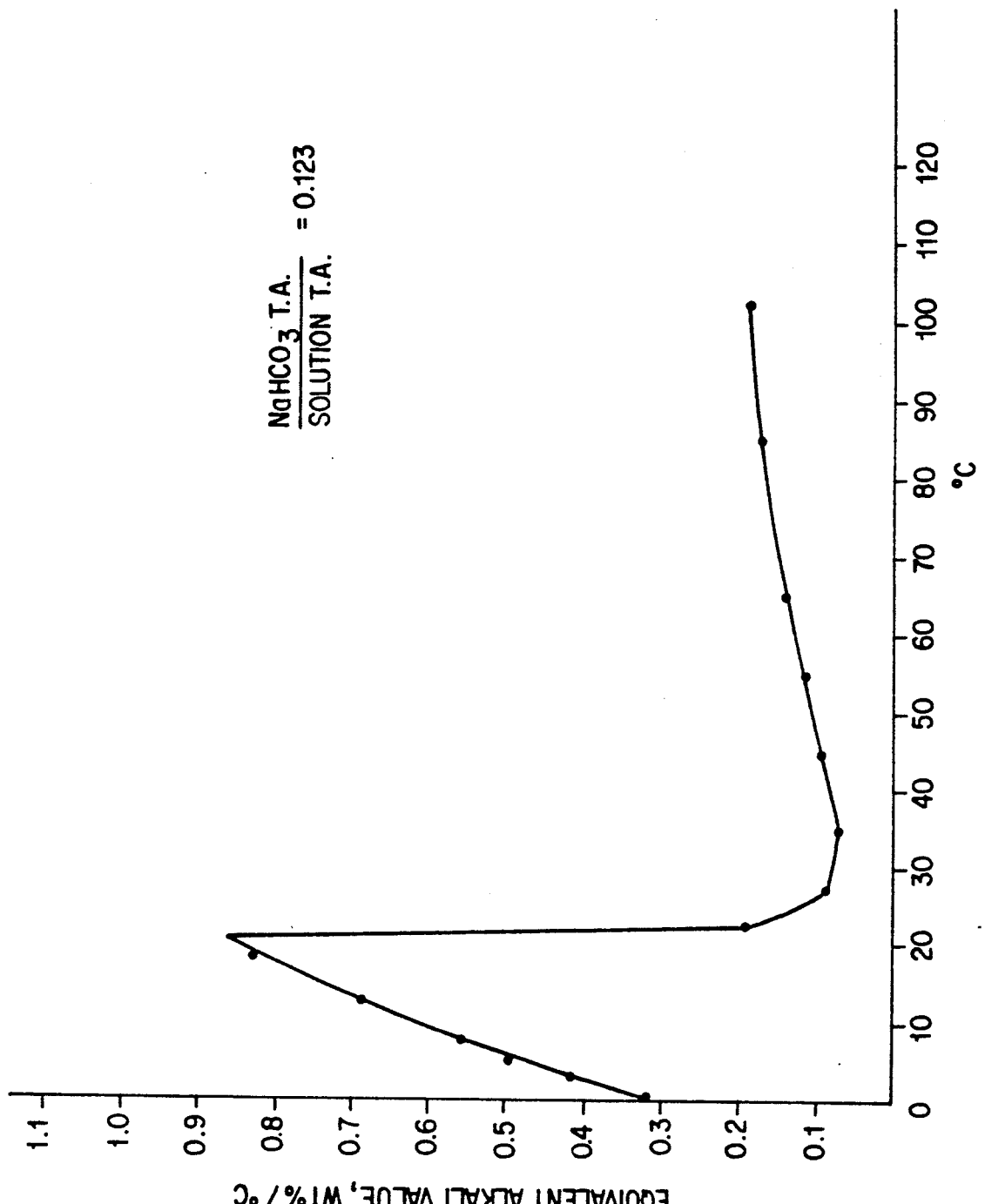
FIG. 2 is a graph of the percent change in dissolution of equivalent alkali values per degree (°C.) plotted against temperature where the sodium bicarbonate TA divided by the solution TA is 0.123.

FIG. 2 is a graph of the percent change in dissolution (solubility) of alkali values (sodium carbonate and/or sodium bicarbonate, expressed as total alkali) per degree centigrade, plotted against temperature for a composition where the sodium bicarbonate TA divided by the solution TA is 0.123. Such a TA ratio is a close approximation of the ratio found in the exit brine when solution mining trona with water at ground temperature is carried out and would be used as the brine feed in the present process.

Figure 3:
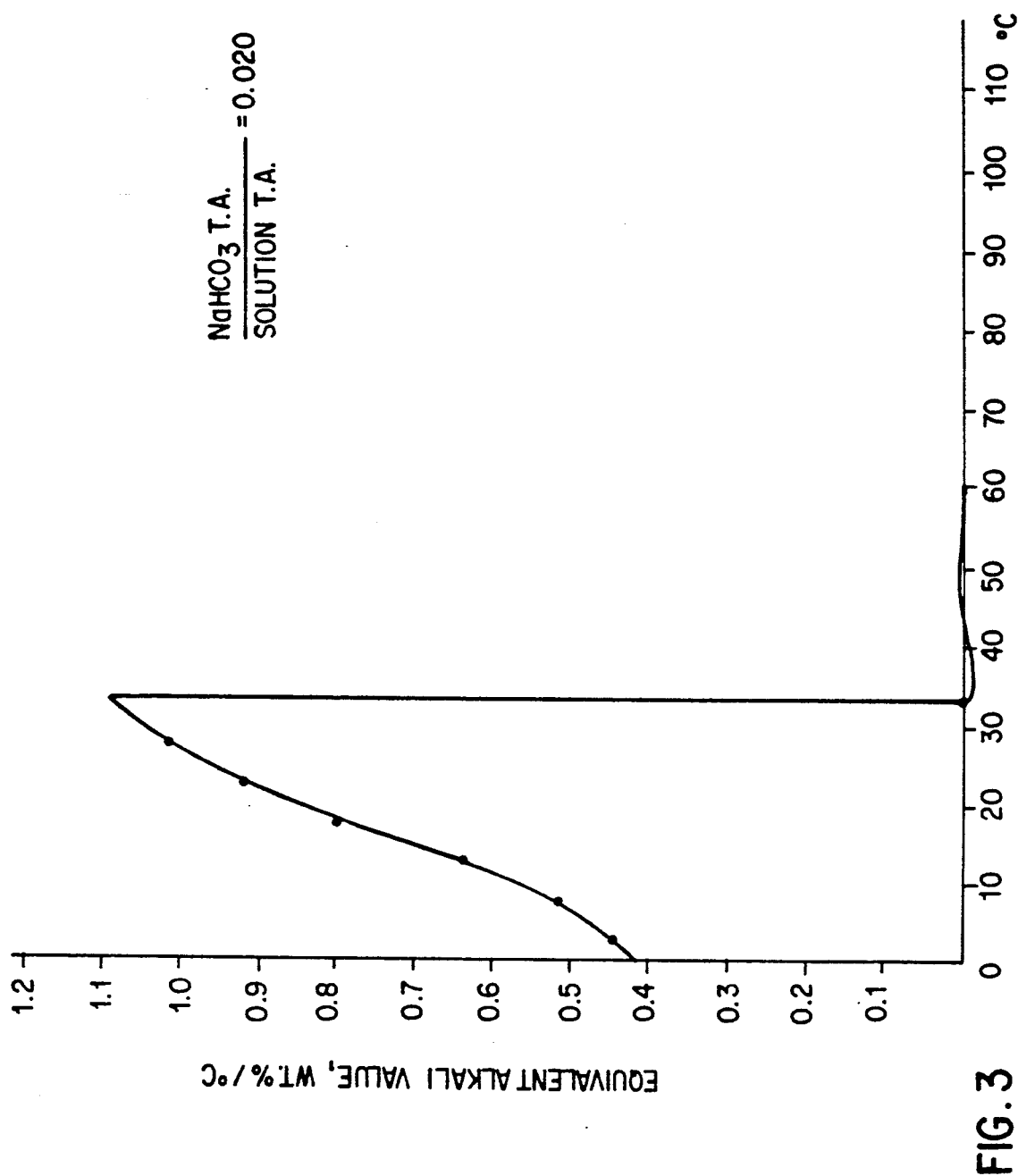
FIG. 3 is a graph of the percent change in dissolution of equivalent alkali values per degree (°C.) plotted against temperature where the sodium bicarbonate TA divided by the solution TA is 0.020.

FIG. 3 is a graph similar to FIG. 2 of the percent change in dissolution (solubility) of alkali values (sodium carbonate and/or sodium bicarbonate, expressed in terms of their total alkali) per degree centigrade plotted against temperature for a solution where the weight percent sodium bicarbonate TA divided by the weight percent solution TA is 0.020. This composition closely approximates the TA ratio found in the evaporated brine after it has undergone crystallization of sodium sesquicarbonate and the crystals separated from the remaining solution. This composition is extremely low in sodium bicarbonate values as would be expected because sodium sesquicarbonate has been crystallized from the solution and with it the bulk of the sodium bicarbonate values.

Figure 4:
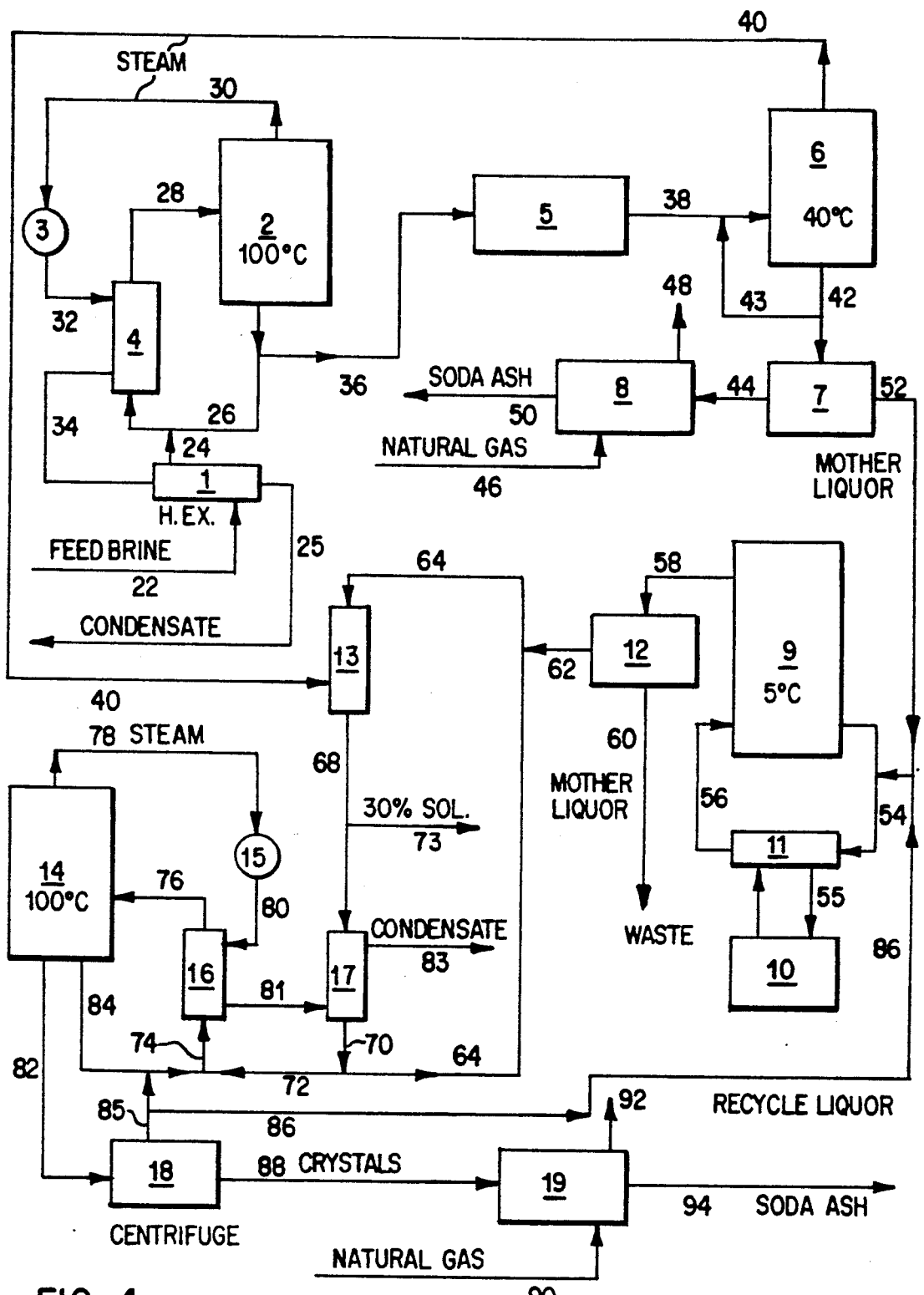
FIG. 4 is a block diagram in schematic form for carrying out the instant process.

FIG. 4 is a block diagram in schematic form for carrying out the instant process.

Referring to FIG. 1, the brine feed which can typically be employed in the present process is set forth by the region designated as B which normally has a sodium bicarbonate TA to solution TA ratio of about 0.10 to about 0.15. A typical feed is the composition having a TA ratio of 0.123 which has been chosen and used in FIG. 2 to show solubility aspects of this brine solution. While this is the preferred feed, the present process can also utilize sodium bicarbonate TA to solution TA ratios of 0.23 which is illustrated by the region identified as C in FIG. 1 and even ratios of 0.33 (trona ratio) which would be the point of intersection between line YZ and the 20° C. solubility isotherm.

The brine feed upon being subjected to evaporation, looses both carbon dioxide and water and preferably arrives at region D in FIG. 1 which is within the sodium sesquicarbonate illustrated area. While it is possible to obtain compositions anywhere along the 100° C. solubility isotherm within the sodium sesquicarbonate area, it is preferred to have a feed brine whose concentration will allow region D to be reached after evaporation since this assures more efficient recovery of the alkali values in the form of sodium carbonate, which is normally preferred. On cooling the evaporated brine solution and precipitating sodium sesquicarbonate crystals, the composition of the liquor changes from region D to region E. Normally, this crystallization is obtained by cooling the solution at region D to temperatures of from about 25° C. to about 45° C. preferably at about 30° C. to about 40° C. and most preferably at about 35° C. to about 40° C.

After separation of the sodium sesquicarbonate crystals the resulting liquor, having a composition illustrated by region E in FIG. 1 normally has a sodium bicarbonate TA to solution TA of about 0.04 or less. A typical composition of such solution, after separation of the crystals, is that which is shown in FIG. 3 where the sodium bicarbonate TA to the solution TA is about 0.02. At this point, the solution is cooled further down to about 0° C. to about 20° C., with about 5° C. to about 15° C. being preferred. This cooling precipitates sodium carbonate decahydrate and the solution changes in composition from region E of FIG. 1 by moving to the left into more dilute solution concentrations and typically ends up at region F of FIG. 1, depending on the exact temperature used in this cooling step. Since the precipitation of sodium carbonate decahydrate removes both sodium carbonate and water from the solution, the concentration of sodium bicarbonate will rise somewhat in the solution remaining from the decahydrate crystallization procedure. However, it should be noted that the decahydrate mother liquor should not be permitted to rise above about 4% sodium bicarbonate. This is achieved either by choice of cooling temperature to maximize removal of bicarbonate values as sodium sesquicarbonate crystals, or by reducing the initial sodium bicarbonate concentration of the feed liquor to the decahydrate crystallizer using caustic soda or equivalent metal hydroxide, or by maintaining control of impurity concentration, so as to avoid precipitating any sodium bicarbonate crystals along with the decahydrate crystals.

A review of FIG. 2 illustrates that at temperatures of from about 0° C. to about 22° C. the change in total alkali solubility is very dramatic. The changes in solubility reach a low at about 35° C. and then gradually increase as the temperature moves up to 100° C. This reveals that using cold to ambient temperatures is much more energy efficient from a heat standpoint for solution mining than higher temperatures because once the temperature is above 22° C. smaller changes in TA solubility occur by using hotter solutions. For example, when increasing the solvent temperature from 65° C. to 70° C., the change in TA solubility is about 0.15% TA per degree centigrade, or an increase of 0.75% TA for a 5° C. warmer solution. If one compares this with going from 10° C. to about 15° C., which constitute the same energy requirements as above, the change in TA solubility averages about 0.70% per degree centigrade or an increase of 3.5% which constitutes about a 4.6 fold increase in TA solubility by using the same amount of energy. If one considers further that by using an aqueous solvent at ambient temperatures of 15° C., the solution will pick up heat from the ground and will become slightly warmer at no energy cost, the reason for using cool water as the solvent becomes immediately clear. Contrast this with a situation where 70° C. solvent is employed which constantly loses heat to the ground and must be replaced by heat energy. From the above it is clear that when considering energy conservation, the best solvent temperature for trona solution mining is when the exit brine temperature is at about 20° C. to about 22° C., which is about the ambient temperature (at about 1500 feet from the surface) of the trona formation normally encountered.

FIG. 2 also illustrates that when the brine feed is evaporated at about 100° C. and becomes saturated the crystal yield on cooling will be about the same whether the cooling stops at 40° C. or any temperature down to about 25° C. Varying the cooling temperature within this range results in very few additional crystals and therefore does not change the solution composition appreciably. Yet, considerable energy can be expended by cooling from 40° C. down to 25° C. Therefore, from an energy conservation point of view, the best temperature to cool and obtain a full crop of sodium sesquicarbonate crystals is about 40° C. without going below about 35° C.

Turning to FIG. 3, this has the same coordinates as FIG. 2 except the solution in FIG. 3 is obtained after the feed brine has been evaporated and cooled to crystallize a crop of sodium sesquicarbonate crystals followed by separation of the crystals from the remaining solution. This solution corresponds to region E on FIG. 1 and has had virtually all of the sodium bicarbonate value removed from the solution during the formation of sodium sesquicarbonate crystals and separation of these crystals from the remaining solution. This is illustrated by the fact that the solution under consideration in FIG. 3 has a sodium bicarbonate TA to total solution TA of only 0.020, indicating that very little sodium bicarbonate is present in solution. In FIG. 3, the change in total alkali solubility per degree centigrade between 0° C. and 100° C. is illustrated for this solution. As can be seen the plot in FIG. 3 contains the same general shape as in FIG. 2 except the steep decline in TA solubility takes place at a higher temperature than in FIG. 2. Again in FIG. 3 the change in TA solubility per degree centigrade is large at all temperatures from freezing to about 33° C. The change at 25° C. to 30° C. is about 1.0% per degree and the change between 5° C. and 10° C. is only half of this or about 0.5% per degree. Therefore, for the same energy input twice the benefit is achieved at the higher temperature range. Any cooling below 30° C. will produce a good yield of product, even cooling down to freezing. However, the temperature range curve in FIG. 3 does have an inflection at about 10° C. Therefore, cooling solution down to this level definitely would produce more product per unit of cooling.

In FIG. 4, there is shown a typical simplified flow sheet in block form of the process. In this flow sheet the feed brine enters at line 22. is preheated in heat exchanger 1 and is passed via line 24 into line 26, where it passes through heat exchanger 4 and is heated, preferably to boiling. The heated solution then passes through line 28 into evaporator 2 which is maintained at about 100° C. Evaporator 2 is a mechanical vapor recompression unit and steam removed through line 30 is compressed in compressor 3 and the compressed steam passes through line 32 into heat exchanger 4 where it is condensed and heats the feed and contents of evaporator 2 circulating through lines 26 and 28. The hot condensate from heat exchanger 4 is removed through line 34 and passed into a second heat exchanger 1 to preheat the incoming feed brine. The cooled condensate from heat exchanger 1 is removed via line 25 and recovered as purified water. The hot evaporated solution is then removed from evaporator 2 and passed via line 36 into filter 5 to remove any precipitated organic material and any insoluble materials in the starting brine. After passing through filter 5, the liquor is removed via line 38 and passed to crystallizer 6 where it is cooled to about 40° C. Preferably, the liquor is cooled under adiabatic conditions created by a barometric condenser 13 which is connected to the crystallizer 6 via line 40. Water which is removed from crystallizer 6 for cooling purposes is condensed in the barometric condenser 13. Upon cooling the liquor in crystallizer 6, a slurry of sodium sesquicarbonate crystals is formed and removed from crystallizer 6 via line 42 and passed into a cyclone or centrifuge 7. An internal loop 43 is maintained to circulate crystal slurry throughout the crystallizer to assure proper crystal growth and crystal habit. The crystal slurry in centrifuge 7 is separated into sodium sesquicarbonate crystals which are removed via line 44 and mother liquor which is removed from the centrifuge via line 52. The sodium sesquicarbonate crystals are preferably washed by means not shown and the washed crystals are then placed in a calciner 8 which is fed by natural gas 46 to produce a medium density soda ash which is removed via line 50. Combustion gases and moisture are removed from the calciner via line 48.

Of course, if desired, all or a portion of the sodium sesquicarbonate crystals may be recovered per se as crystallized products rather than converting them to soda ash as shown above.

The mother liquor removed from centrifuge 7 via line 52 is then fed into line 54 and passed through a heat exchanger 11 where it is cooled, and the cooled solution passed via line 56 into crystallizer 9. A refrigeration unit 10 is employed via line 55 to keep the heat exchanger 11 at a sufficiently cold temperature to maintain the contents of crystallizer 9 at about 5° C. Some of the contents of the crystallizer are also circulated continuously through heat exchanger 11 via lines 54 and 56. Upon being cooled to 5° C. in crystallizer 9 the solution yields a slurry of sodium carbonate decahydrate crystals which are removed from the crystallizer through line 58 and passed to the centrifuge 12. The sodium carbonate decahydrate crystals are removed through line 62 and passed via line 64 into the barometric condenser 13. The mother liquor separated from the crystals in centrifuge 12 is removed through line 60 and can be sent to waste. However, for optimum conservation of residual alkali values in the stream and for recovery of the water in this dilute stream, a portion of this mother liquor can be recycled (not shown) to the initial evaporator 2 while the remainder will be discarded to assure a purge for the impurities in this stream and prevent impurity levels from rising in the system.

Alternately, the waste stream from line 60 can be used as part of the solvent employed in solution mining of trona thereby increasing its total alkali value and facilitating the providing of a brine feed to the instant process. Whether a portion of the mother liquor must be purged before the remainder is used for solution mining will depend on the impurity levels in the mother liquor. In general, the impurities from the feed brine concentrate in the mother liquor from crystallizer 9 and some provision for the removal of these wastes must be made.

The separated sodium carbonate decahydrate crystals from centrifuge 12 are passed via line 62 and slurried with some solution to permit them to be conveyed via line 64 into barometric condenser 13. Water vapor removed from crystallizer 6 under vacuum is conveyed by line 40 and condensed in barometric condenser 13 which is equipped with a barometric leg 68. The cold sodium carbonate decahydrate crystals which are passed into barometric condenser 13 condense the water vapor entering through line 40 and the crystals obtain sufficient heat and condensed water to melt the decahydrate crystals and yield about a 30% by weight sodium carbonate solution. A portion of this 30% solution can be removed through line 73 for the production of other sodium-containing chemicals such as sodium phosphates or sodium hydroxide by reaction with lime. The remainder of the solution is passed through a heat exchanger 17 and exits through line 70 and then is split so that one portion goes through line 72 while the remainder goes through line 64. Line 64 is a recycle loop to slurry up additional sodium carbonate decahydrate crystals and return the slurry to the barometric condenser 13. The heat picked up by the solution from heat exchanger 17 aids in supplying the necessary heat to assure melting of the decahydrate crystals in the barometric condenser 13.

The remaining solution is passed via line 72 through line 74 into heat exchanger 16 where it is heated to about 100° C. and passed via line 76 into evaporator crystallizer 14. The evaporator crystallizer 14 is a mechanical vapor recompression unit in which steam removed from evaporator crystallizer 14 through line 78 is compressed in compressor 15 and the compressed steam is introduced via line 80 into heat exchanger 16. The steam vapors are condensed in heat exchanger 16 and the hot condensate is removed via line 81 and introduced into heat exchanger 17 where its remaining heat is used to supply heat to the 30% sodium carbonate solution introduced via line 68. The cooled condensate is then removed via line 83 and recovered. In evaporator crystallizer 14, sodium carbonate monohydrate crystals are formed and a slurry of these crystals is removed through line 82 and passed into centrifuge 18. In centrifuge 18, the crystals are removed through line 88 and passed into a dryer 19 heated by natural gas introduced through 90 while soda ash of high density is recovered from the dryer through line 94. Water vapor and combustion gases are removed from the dryer 19 through line 92. The mother liquor is removed from centrifuge 18 through line 85 and the bulk of the stream is returned to evaporator crystallizer 14 through line 85 into line 84 and then through line 74 into heat exchanger 16 from which the heated solution is removed and returned to the evaporator crystallizer 14 through line 76. A portion of the mother liquor is removed as recycle and conveyed via line 86 into lines 54 and 56 for introduction into the sodium carbonate decahydrate crystallizer 9. This has the effect of concentrating any impurities in the mother liquor from the monohydrate unit in the waste stream 60 from the sodium carbonate decahydrate crystallizer. The TA values in the monohydrate mother liquor from line 86 are recovered in the sodium carbonate decahydrate crystallizer as sodium carbonate decahydrate crystals. By concentrating the impurities from the monohydrate mother liquor 86 in stream 60 smaller quantities of purge stream are needed to remove these impurities from the system, while recovering all of the sodium carbonate values of stream 86 introduced into crystallizer 9.

The present process has major advantages over those presently used in the art. Among these advantages are the following:

a The instant process can utilize as the feed, solution mined trona, where the in situ mining has been carried out using ambient temperature water as the solvent notwithstanding the fact these solutions do not contain the high concentrations of total alkali normally required and employed in the sesquicarbonate process and in the monohydrate process. A low temperature aqueous solvent is of course most desirable because it minimizes energy requirements for solution mining.

b. The alkali values from the solution mined trona can be converted into a variety of products namely sodium sesquicarbonate crystals, sodium decahydrate crystals, a pure 30% by weight sodium carbonate solution, sodium carbonate monohydrate crystals and finally soda ash crystals. The crystalline products have each separate applications and advantages as final saleable products while the sodium carbonate solution is useful as a raw material when making other sodium-based chemicals such as sodium hydroxide or sodium phosphate.

c. The instant process, which permits a plant to produce different precursor crystals permits several grades of soda ash to be readily produced. For example, a very low density soda ash can be produced by direct, low temperature drying of the decahydrate crystals. An intermediate density soda ash is obtainable from the sesquicarbonate crystals while a high density soda ash is obtainable from the sodium carbonate monohydrate or sodium carbonate anhydrous crystals. Also, a very high purity soda ash from the instant monohydrate crystallization step can be obtained without additional alkali loses. No existing process permits a single plant to produce such a wide assortment of precursor crystals and from them soda ash of varying physical properties.

d. The instant process permits recovery of what is currently considered waste streams, which do not have enough alkali values or which have unacceptable impurity levels for processing by conventional technology. These waste streams can be used as the solvent in the solution mining step to take on additional alkali values and can be employed as the feed brine to the instant process. The crystallization of sodium sesquicarbonate and decahydrate permit recovery of purified crystals with the major proportion of impurities concentrated in the final mother liquor. This facilitates disposal because the impurities are concentrated and the concentrated waste solutions are easier to dispose of than more dilute ones.

EXAMPLE 1

Following the process as described in accordance with FIG. 4, 300 gallons per minute of feed brine of the composition listed in Table II at 20° C. are fed into heat exchanger 1 and evaporator 2, where about 80,000 pounds per hour of water is evaporated as stream 30 and condensed in heat exchanger 4 to recover 157 gpm of condensate in stream 25. The concentrated liquor, designated as stream 36 is filtered and sent to crystallizer 6. An additional 9,700 pounds per hour of water is evaporated and leaves crystallizer 6 via stream 40, which cools the solution. The crystal slurry stream 42 is sent to centrifuge 7 resulting in approximately 120 gallons per minute of mother liquor and 5.6 tons per hour of crystals. The crystals are removed via 44 and then heated via natural gas, shown as stream 46 in calciner 8 to produce about four tons per hour of soda ash shown as stream 50.

The mother liquor, stream 52, is further cooled in crystallizer 9. Since in this illustrative example, the liquor of stream 52 is cooled via refrigerant, stream 55, there is no significant water loss from the system in this area. The sodium carbonate decahydrate crystal slurry from crystallizer 9 is sent via stream 58 to centrifuge 12. Approximately 42 gallons per minute of mother liquor is discarded as waste via stream 60 and 55,000 pounds per hour of decahydrate crystals, in stream 62 is sent via 62 and 64 to barometric condenser 13. Stream 64 is a recycle stream into which the deca crystals are added to slurry the crystals and transport them to the barometric condenser 13. From the recycle, stream 73 is split off from barometric leg 68 and about 21 gallons per minute of 30% sodium carbonate solution is removed for producing sodium phosphates (or other chemicals). This is equivalent to two tons per hour of soda ash. The remaining stream 70 is split into recycle via stream 64 and into feed stream 72 which is sent to evaporator/crystallizer 14. About 36,000 pounds per hour of water is evaporated and condensed in heat exchanger 16 to form 70 gallons per minute of condensate. The 19,000 pounds per hour of sodium carbonate monohydrate crystals from centrifuge 18 are converted in dryer 19 into 8.1 tons per hour of very high purity soda ash shown as stream 94. The mother liquor in stream 85 is divided into two streams, one of which is returned via streams 84 and 74 to heat exchanger 16 and then via 76 to evaporator/crystallizer 14, while the remaining stream 86 is returned to crystallizer 9 via streams 54 and 56. Overall, what would normally be considered to be 300 gallons per minute of dilute waste material is converted into 14.4 tons per hour of soda ash values, 42 gallons per minute of concentrated waste and 227 gallons per minute of valuable condensate.

Example 1 with the material balance as listed in Table II does not include such streams as centrifuge wash water, defoamer, crystal growth modifiers or other additives in order to simplify the flow diagram. Also to achieve an optimum energy, temperature, and enthalpy balance would require additional heat exchange equipment and consideration of the effect of impurities, which have not been included since they are within the knowledge of those skilled in the art.

While many modifications of the process have been described, other modifications may be made in the principle process to optimize the results, continuous or batch operations, and other changes may be used, without departing from the spirit of the invention or scope thereof.

TABLE II

|  | I.D. | K#/hr | GPM | Temp °C. | Wt % % $Na_2CO_3$ | % $NaHCO_3$ | % NaCl | % $Na_2SO_4$ |
|---|---|---|---|---|---|---|---|---|
| Feed Brine | 22 | 180.0 | 300 | 20 | 14.9 | 3.9 | 0.90 | 0.30 |
| Vapor | 30 | 79.7 | — | — | — | — | — | — |
| Condensate | 25 | 78.7 | 157 | 25 | — | — | — | — |
| Conc. Brine | 36 | 100.3 | 155 | 100 | 28.0 | 5.0 | 1.62 | 0.54 |
| Vapor | 40 | 9.7 | — | — | — | — | — | — |
| Slurry (Sesqui) | 42 | 90.6 | — | 40 | — | — | — | — |
| Natural Gas | 46 | — | — | — | — | — | — | — |
| Soda Ash | 50 | 7.9 | — | — | 99.8 | — | — | — |
| Mother Liquor | 52 | 79.3 | 120 | 40 | 28.0 | 1.0 | 2.04 | 0.68 |
| Refrigerant | 55 | — | — | 10 | — | — | — | — |
| Slurry (Deca) | 58 | 82.6 | — | 15 | — | — | — | — |
| Waste Soln. | 60 | 25.1 | 42 | 15 | 10.0 | 3.2 | 6.54 | 2.18 |
| Barometric Cond. Feed | 62 & 64 | 114.0 | 300 | — | — | — | — | — |
| Recycle | 64 | 57.0 | 150 | 35 | 29.0 | — | — | — |
| Soln. Product | 73 | 14.0 | 21 | 35 | 29.0 | — | — | — |
| Mono Feed Soln. | 72 | 59.0 | 90 | — | 29.0 | — | — | — |
| Slurry (Mono) | 82 | — | — | — | — | — | — | — |
| Recycle | 86 | 3.3 | 5 | 90 | 31.0 | <0.1 | <0.01 | <0.01 |
| Soda Ash | 94 | 16.2 | — | — | 100.0 | — | — | — |
| Condensate | 83 | 36.3 | 70 | 40 | — | — | — | — |
| TA recovery = 92% | | | | | | | | |

We claim:

1. Process for producing sodium-based chemicals from a brine containing sodium carbonate and sodium bicarbonate which comprises heating the brine to evaporate water, convert sodium bicarbonate to sodium carbonate and to drive off resulting carbon dioxide therefrom until the concentration of sodium carbonate and sodium bicarbonate in the brine form a solution that will crystallize sodium sesquicarbonate, cooling the evaporated brine to induce precipitation of sodium sesquicarbonate, precipitating sodium sesquicarbonate crystals, separating the sodium sesquicarbonate crystals from a first mother liquor, cooling the first mother liquor to a lower temperature to induce precipitation of sodium carbonate decahydrate, precipitating sodium carbonate decahydrate crystals, separating the sodium carbonate decahydrate crystals from a second mother liquor, and recovering the sodium carbonate decahydrate crystals for use in the manufacture of sodium-containing chemicals.

2. Process of claim 1 wherein said brine has a total alkali value of at least about 8% by weight.

3. Process of claim 1 wherein the recovered sodium carbonate decahydrate crystals are melted and a purified solution of sodium carbonate is recovered for use in manufacturing sodium-containing chemicals.

4. Process of claim 1 wherein the recovered sodium carbonate decahydrate crystals are dried at a sufficiently low temperature without melting, to convert them to soda ash.

5. Process of claim 1 wherein said brine is heated to a temperature of from about 90° C. to about 115° C.

6. Process of claim 1 wherein said brine is heated to a temperature of from about 100° C. to about 110° C.

7. Process of claim 1 wherein said evaporated brine is cooled to a temperature of from about 25° C. to about 45° C.

8. Process of claim 1 wherein said evaporated brine is cooled to a temperature of from about 35° C. to about 40° C.

9. Process of claim 1 wherein the first mother liquor is cooled further to about 0° to about 20° C.

10. Process of claim 1 wherein the first mother liquor is cooled further to about 5° C. to about 15° C.

11. Process of claim 1 wherein said crystals of sodium sesquicarbonate are heated to convert them into soda ash.

12. Process of claim 1 wherein said sodium sesquicarbonate crystals are recycled and mixed with the brine being heated.

13. Process of claim 1 wherein said crystals of sodium carbonate decahydrate are melted to form a solution of sodium carbonate and the solution heated to evaporate water and crystallize sodium carbonate monohydrate and separating and recovering said crystals from their mother liquor.

14. Process of claim 13 wherein said heating of said solution of sodium carbonate is carried out at temperatures above about 60° C. but below about 110° C.

15. Process of claim 13 wherein said crystals of sodium carbonate monohydrate are heated to convert them into soda ash.

16. Process of claim 13 wherein said mother liquor separated from the sodium carbonate monohydrate crystals is recycled back and mixed with the sodium carbonate solution being evaporated to produce sodium carbonate monohydrate crystals.

17. Process of claim 13 wherein said mother liquor separated from the sodium carbonate monohydrate crystals is in part recycled and mixed with the first mother liquor being further cooled to produce sodium carbonate decahydrate.

18. Process of claim 1 wherein said crystals or sodium carbonate decahydrate are melted to form a solution of sodium carbonate, the solution is heated to evaporate water and crystallize sodium carbonate anhydrous and separating and recovering said crystals from their mother liquor.

19. Process of claim 18 wherein said heating of said solution of sodium carbonate is carried out at temperatures above about 110° C.

20. Process of claim 1 wherein said second mother liquid is purged and impurities are removed from the process.

21. Process of claim 1 wherein said second mother liquor is purged in part and prevents impurities build-up in the process while the remaining part is recycled and mixed with said brine being evaporated.

22. Process of claim 1 wherein said brine is obtained by solution mining of a trona formation.

23. Process of claim 22 wherein said solution mining is carried out by employing an aqueous solvent at a temperature no higher than about 35° C.

24. Process of claim 23 wherein the aqueous brine recovered from solution mining has a temperature no higher than about 22° C.

25. Process of claim 22 wherein the solution mining is carried out at the ambient temperature of the trona formation.

26. Process of claim 1 wherein the brine is mine water in contact with trona formations.

27. Process of claim 1 wherein the brine is wholly or in part waste aqueous solutions of sodium carbonate and/or sodium bicarbonate.

28. Process of claim 1 wherein said second mother liquid is carbonated to crystallize sodium bicarbonate crystals and separating and recovering said crystals from their mother liquor.

29. Process of claim 1 wherein said crystals of sodium carbonate decahydrate are melted to form a solution of sodium carbonate which is reacted with lime to form caustic soda.

30. Process of claim 1 wherein said brine is carbon treated to remove organic impurities.

31. Process of claim 1 wherein any residual sodium bicarbonate in said first mother liquid is converted to sodium carbonate with caustic soda.

32. Process for producing sodium-based chemicals from a brine containing sodium carbonate and sodium bicarbonate which comprises heating the brine to temperatures of from about 90° C. to about 115° C. to evaporate water, convert sodium bicarbonate the sodium carbonate and to drive off resulting carbon dioxide therefrom until the concentration of sodium carbonate and sodium bicarbonate in the brine form a solution that will crystallize sodium sesquicarbonate, cooling the evaporated brine at about 25° C. to about 45° C., precipitating sodium sesquicarbonate crystals, separating the sodium sesquicarbonate crystals from a first mother liquor, cooling the first mother liquor to a temperature of about 0° C. to about 20° C., precipitating sodium carbonate decahydrate crystals, separating the sodium carbonate decahydrate crystals from a second mother liquid, melting the sodium carbonate decahydrate crystals to form a sodium carbonate solution, heating the sodium carbonate solution at a temperature above about 60° C. but below about 110° C. to evaporate water, crystallizing sodium carbonate monohydrate crystals, separating said sodium carbonate monohydrate crystals from their mother liquor, heating said sodium carbonate monohydrate crystals until they are converted to soda ash and recovering the soda ash.

33. Process of claim 32 wherein said brine has a total alkali value of at least about 8% by weight.

34. Process of claim 32 wherein said brine is obtained by solution mining of a trona formation.

35. Process of claim 34 wherein said solution mining is carried out by employing an aqueous solvent at temperatures of no higher than about 35° C.

36. Process of claim 32 wherein said brine is heated at about 100° C. to about 110° C.

37. Process of claim 32 wherein the evaporated brine is cooled at about 35° C. to about 40° C.

38. Process of claim 32 wherein the first mother liquid is cooled at about 5° C. to about 15° C.

39. Process of claim 32 wherein the sodium carbonate solution is heated at about 100° C.

40. Process of claim 32 wherein said sodium sesquicarbonate crystals are recycled and mixed with the brine being heated.

41. Process of claim 32 wherein any residual sodium bicarbonate remaining in said sodium carbonate solution is reacted with caustic soda to convert the sodium bicarbonate to sodium carbonate.

42. Process for producing sodium-based chemicals from a brine containing sodium carbonate and sodium bicarbonate that is obtained by contact of water with an underground trona formation and which has a total alkali value of at least 8% by weight which comprises heating the brine to evaporate water, convert sodium bicarbonate to sodium carbonate and to drive off resulting carbon dioxide therefrom until the concentration of sodium carbonate and sodium bicarbonate in the brine form a solution that will crystallize sodium sesquicarbonate, cooling the evaporated brine to induce precipitation of sodium sesquicarbonate, precipitating sodium sesquicarbonate crystals, separating the sodium sesquicarbonate crystals from a first mother liquor, cooling the first mother liquor to a lower temperature to induce precipitation of sodium carbonate decahydrate, precipitating sodium carbonate decahydrate crystals, separating the sodium carbonate decahydrate crystals from a second mother liquor, and recovering the sodium carbonate decahydrate crystals for use in the manufacture of sodium-containing chemicals.

* * * * *

UNITED STATES PATENT AND TRADEMARK OFFICE
CERTIFICATE OF CORRECTION

PATENT NO. : 5,262,134
DATED : November 16, 1993
INVENTOR(S) : William R. Frint and William C. Copenhafer It is certified that error appears in the above—identified patent and that said Letters Patent is hereby corrected as shown below:

Column 7, line 26, "Actual al expe" should read --Actual expe- --. Column 16, line 25, "22." should read --22,--. Column 18, line 41, "a" should read --a.--. Column 22, line 3, "or" should read --of--; line 52, "sodium bicarbonate the sodium" should read --sodium bicarbonate to sodium--. Column 23, line 16, "liquid" should read --liquor--.

Signed and Sealed this

Third Day of May, 1994

Attest:

BRUCE LEHMAN

Attesting Officer

Commissioner of Patents and Trademarks